United States Patent [19]

Legrain

[11] Patent Number: 5,320,067

[45] Date of Patent: Jun. 14, 1994

[54] INDIVIDUAL ANIMAL IDENTIFICATION SYSTEM IN A CONTROL STATION

[75] Inventor: Michel Legrain, Foulbec, 27210 Beuzeville, France

[73] Assignee: Michel Legrain, France

[21] Appl. No.: 45,193

[22] Filed: Apr. 13, 1993

[30] Foreign Application Priority Data

Apr. 14, 1992 [FR] France .................. 92 04537

[51] Int. Cl.$^5$ ................................ A01K 5/02
[52] U.S. Cl. .................... 119/51.02; 119/859
[58] Field of Search ............ 119/51.02, 51.11, 52.4, 119/762, 856, 858, 859; 340/573

[56] References Cited

U.S. PATENT DOCUMENTS

| | | | |
|---|---|---|---|
| 3,788,278 | 1/1974 | Propst et al. | 119/51.02 |
| 4,129,855 | 12/1978 | Rodrian | 119/51.02 |
| 4,426,955 | 1/1984 | Monroe et al. | 119/51.02 |
| 4,655,170 | 4/1987 | DaSilva | 119/51.02 |
| 4,798,175 | 1/1989 | Townsend et al. | 119/51.02 |
| 5,008,660 | 4/1991 | de Jong | 119/51.02 |

FOREIGN PATENT DOCUMENTS

| | | |
|---|---|---|
| 0404148A1 | 12/1990 | European Pat. Off. . |
| 87072297 | 9/1987 | Fed. Rep. of Germany . |
| 7713412 | 6/1979 | Netherlands ............ 119/51.02 |

*Primary Examiner*—Gene Mancene
*Assistant Examiner*—Todd E. Manahan
*Attorney, Agent, or Firm*—Banner, Birch, McKie & Beckett

[57] ABSTRACT

An individual animal identification system in a station includes a structure forming a passage way in which the animal, whose neck is furnished with an identification collar, engages its head, spreading metallic bars affixed on articulated flaps on the structure of the station. The collar worn by each animal is in the form of a V with a large base radius. The collar includes two identical parts, each formed from a metallic tube, protected against corrosion or made of stainless steel, whose top extremity has a passage hole for a cord permitting the easy attachment of the collar to the animal's neck. The bottom extremity of the two identical parts of the collar is either pressed or held on a tube made on a semi-rigid plastic material. An electronic identification circuit for storage of a specific identification number is disposed in the plastic tube. In operation, the collar closes a presence detection electrical circuit when it comes in contact with the metallic bars affixed to the flaps. The electronic identification circuit modulates the current flowing in the closed circuit, and thereby communicates its identification number to a data processor which senses and analyzes the current flowing in the presence detection electrical circuit and determines the identification number.

33 Claims, 4 Drawing Sheets

INDIVIDUAL ANIMAL IDENTIFICATION SYSTEM IN A CONTROL STATION

BACKGROUND

1. Field of the Invention

The invention relates to the identification of animals in a control station, or a station for various other functions, or in a passage area.

2. Description of Related Art

There exists identification systems for use in feeding stations or in passage areas which use a badge or a similar item attached to an animal's neck. Such a system includes an emitter system with its own energy source coupled with a magnetic passage detection system to detect the passage of the emitter. The emitter is designed so as to emit a specific identification signal when under the influence of a radio electric activated field generated by the control station. The specific signal from the badge is received by a receiver in the control station. This signal is utilized to activate and track various operations relative to the animal in the control station. The system is complicated and very expensive. Furthermore, it requires periodic inspection of the electrical source in each badge and replacement of the electric source whenever necessary. If this monitoring and replacing operation is not timely conducted, each animal on which the badge is no longer active is not identified when present in the control station.

SUMMARY OF THE INVENTION

The system according to the present invention overcomes these problems. Each animal wears an extremely simplified collar which does not require an emitter or an energy source. The collar functions to physically close a presence detection electrical circuit when it is inserted in the control station. The closing of this circuit sends an animal presence signal by conducting a carrying current which then permits the collar to transmit its specific identification number by modulating the carrying current, the specific identification number being associated with characteristics of the animal carrying the collar. This identification number is obtained by simple electronic means, the means being an identification circuit placed in the collar working in conjunction with a data processor.

According to a preferred embodiment, the individual animal identification system includes a plurality of identical control stations in which the apparatus for identifying each animal in each station includes two metallic bars, cylindrical in nature, attached at their extremities to respective flaps of the control station, each metallic bar being disposed horizontally or slightly inclined on a flap and symmetrical to a vertical plane XX'. These flaps are articulated with hinges forming a closed passage whose width permits the engagement of the front portion of the body of the animal in the case of the feed distribution station. Upon the insertion of the animal's head, whose neck is adorned with a collar, the collar cooperates with the metallic bars to assure closing of an electrical presence detection circuit. The electrical presence detection circuit cooperates with a data processor and an electronic identification circuit to read, transmit and recognize the identification number of the collar.

According to the invention, the collar worn by each animal is in the approximate form of a V with a large base radius. It includes two identical parts, each made with metallic tubes with anti-corrosion protection or made with stainless steel. The top extremity of the collar has a means for attaching the collar to the neck of an animal. The bottom extremity is either pressed or held against a semi-rigid plastic tube in which an electronic identification system is placed.

According to a variation in the system's realization the station controls when an animal can traverse the station. A width between and a height to the control bars and a swinging radius of the flaps is adjustable to match the station to the size of the animal, the passage of which is being controlled. The flaps preferably have locking means that are controlled at certain hours of the day or night by a controlling data processor. According to the invention the individual animal identification system includes an identification circuit disposed within a collar as a carrier and having an identification number recorded therein, the collar cooperating with a control station, wherein the identification circuit includes:

means M1 for receiving energy from the carrying current and for producing the electrical supply for the identification circuit;

means M2 having part ME for non-volatile memory storage of the identification number N, the number N being prerecorded in ME through a means of connection MM that is connected to a central unit UC or to a data processor, the means M2 also having a second part MC which sends the number N;

means M3 having a part ML to read or to receive the identification number N sent by part MC and a part MT for transmitting an identification signal or signals, preferably transmitted as a pulse train through a means MS which conditions the exiting signal; and means MS for exit signal conditioning which mixes the pulse train of the identification signal with the carrying current flowing in the presence detection electrical circuit, which is preferably read by the central unit or the data processor which recognizes the number N of the collar and which undertakes operations associated with the animal carrying the collar having the number N.

The advantages of this system, according to this invention include the following:

simplicity of the collar and of its number transmission method, guaranteeing the identification of the animal;

absence of a requirement for the portable energy source;

maintenance free collar, providing great reliability;

physical presence detector which automatically adapts itself to the different size of animals; and means for monitoring of a frequency and length of stay of the animal in the station.

The system can be applied to the recognition, the selection, the counting and the selective feeding of each animal wearing a collar in accordance with this invention (for example, see copending U.S. patent application by Michel Legrain filed concurrently with this U.S. patent application and entitled "COMPUTER AIDED FEED DISTRIBUTION EQUIPMENT FOR YOUNG ANIMALS", the disclosure of which is incorporated herein by reference), and also to the control of passage of the animal through the control station. The animal may be allowed or prevented passage at certain arbitrary or selected times.

BRIEF DESCRIPTION OF THE DRAWINGS

The animal identification system according to this invention is described in detail in the following text with reference to the attached drawings which are non-limiting examples, wherein.

DESCRIPTION OF PREFERRED EMBODIMENTS

Figure 1:
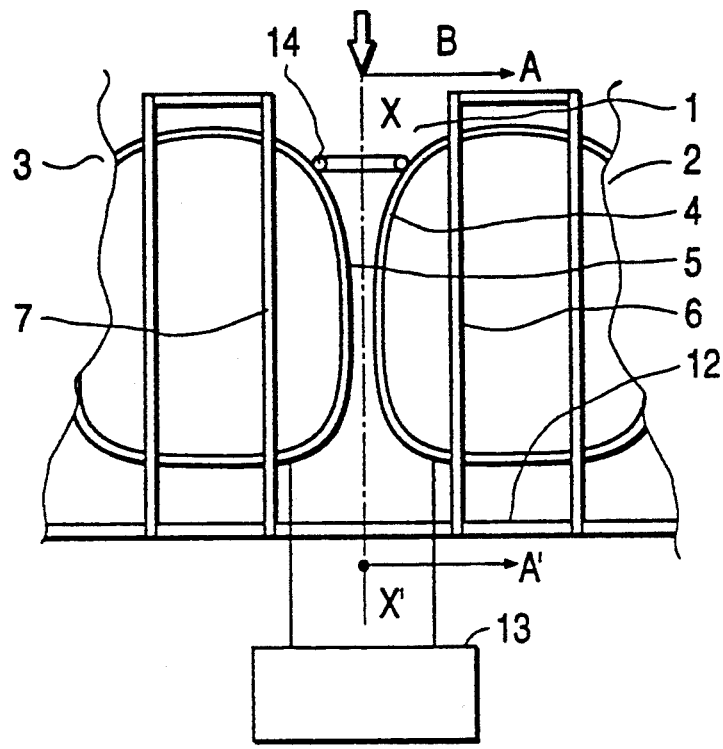
FIG. 1 shows a top view of the system according to this invention.
Figure 2:
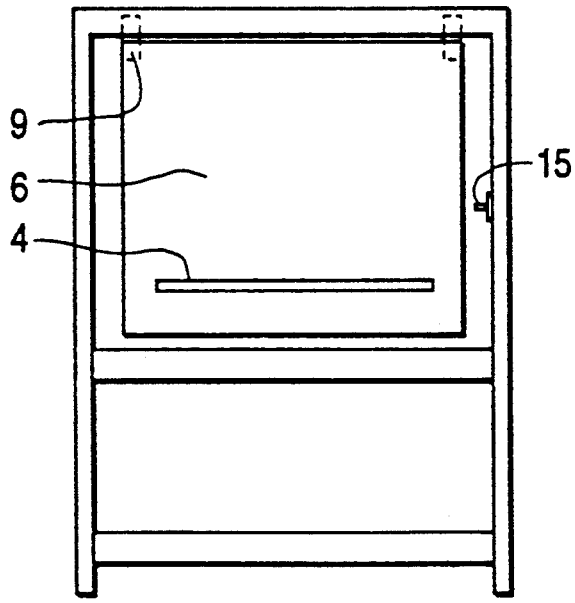
FIG. 2 shows a side view along section line AA' of FIG. 1.
Figure 3:
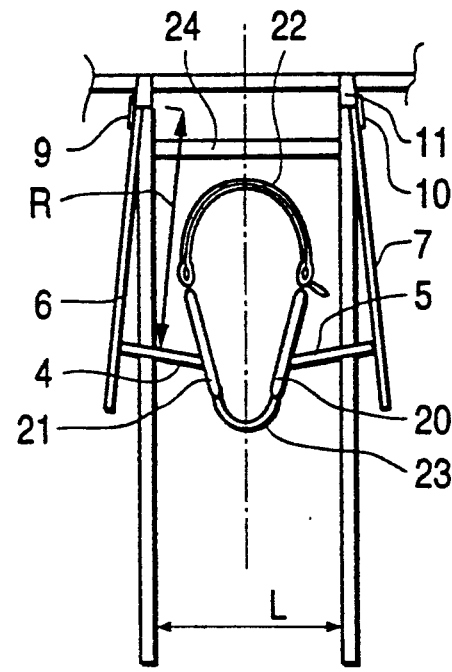
FIG. 3 is an elevation drawing showing the entrance to the station from the direction of arrow B of FIG. 1.

FIG. 1 is a top view; FIG. 2 is a side view and FIG. 3 is an elevation view of a typical control station of a plurality of identical control stations 1, 2, 3, . . . , each furnished with means of identification of each animal. The means for identification includes two metallic bars 4, 5, cylindrical in section affixed at their extremities to respective flaps of the control station, each metallic bar being disposed horizontally or slightly inclined on flaps 6, 7, symmetrical to a vertical plane XX' (FIG. 1). The flaps 6, 7, are articulated by means of hinges 9, 10 on a structure 11, either metallic, wood or both. This structure and flaps form a passage way, closed at one end by partition 12 or not depending on the use, the passage way being of such a width as to permit the entrance of the front of the body of the animal in the case of a station for distribution of feed. The engagement of a collar 14 carried on the neck of an animal with the metallic bars 4, 5 is shown as a cross section in FIG. 1. The end of the passage in a station may be furnished, for example, with a nipple 15 (FIG. 2) or other feeding methods depending on the age of the animal. In the case of a station for passage, the width L (FIG. 3) of the station and also the height of bars 4 and 5 and the swinging radius R of flaps 6, 7 are dimensioned appropriately or adjusted according to the size of the animals to be controlled. The swinging radius of the flaps is in this case much larger. If one wants to prohibit the passage of the animal at certain hours of day or night, selectively or not, the opening of the flaps may be locked; for example, by an electro-magnetic mechanism of an electric striker plate type or similar mechanism.

To permit the collar to contact the bars 4, 5 so as to assure the identification function in the passage way, it is preferable that the animal present itself with a lowered head. A deflector 24 (FIG. 3) adjustable in height, which forms a sort of sliding panel, may be used to force the animal to lower its head to the height of the bars which themselves can be adjusted in height. The position and width of the flaps 6, 7 may also be adjusted depending on the type and size of the animal to be controlled. Naturally, these same adjustments can be adapted in the case of a feeding station.

The collar 14, used in this system according to the invention, is simplified when compared to conventional devices. The collar is shown in an elevation view in FIG. 3 as if it were placed on the neck of an animal to be identified. The collar is in the approximate form of a V with a wide base radius. It includes of two identical parts 20, 21, each made of, for example, a metal tube protected against rust or made of stainless steel. The top extremity of each of these tubes is preferably pressed, punched, and deburred to form a hole for passage of a cord 22 to make easy the attachment of the collar around the neck of the animal. The bottom extremity is either pressed or held against a tube 23, preferably made of a semi-rigid plastic material, so as to make the unit tamper-proof and to preserve its approximate V shape. A preprogrammed electronic identification circuit 25 (FIG. 4) is placed in tube 23. This electronic identification circuit does not require either an emitter or an energy source. It only serves the function of physically closing an animal presence detection electrical circuit when the collar penetrates into the control station by connecting one of parts 20, 21 to one of bars 4, 5 and the other of parts 20, 21 to the other of bars 4, 5. The closing of the animal presence detection electrical circuit causes a carrying current to pass through the electronic identification circuit due to a source voltage applied across bars 4, 5 and a selectively controllable resistance internal to the identification circuit 25. The carrying current functions as an animal presence signal to indicate the presence of an animal in the station. This in turn allows the electronic identification circuit to extract electrical power from the control station to operate the electronic identification circuit and modulate the carrying current with a specific code which identifies and characterizes the animal present in the control station. This identification is obtained with the cooperation of the electronic identification circuit which is placed in each collar and with a data processor or computer. The data processor typically manages the activities of all animals that need to be controlled that are present in the area of the control station including buildings and/or fields. The electronic identification circuit which is integrated into the collar may be used, in cooperation with the data processor, to perform other functions such as a determination of a length of stay in each feeding station and other specific information storage related to each animal.

Figure 4:
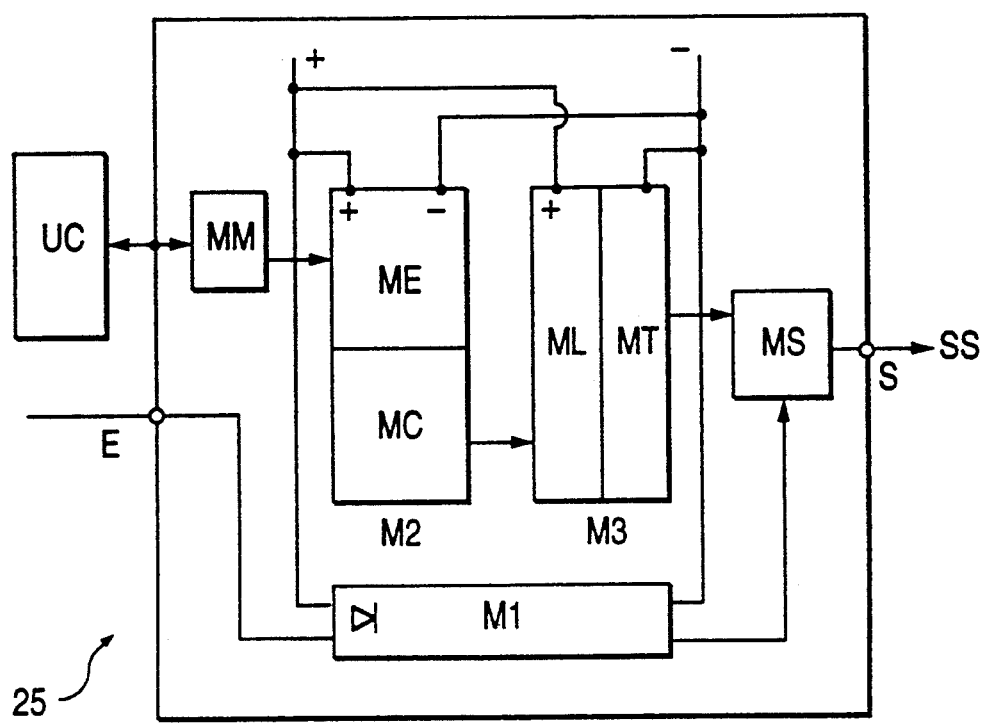
FIG. 4 is a functional block diagram of the electronic identification circuit according to this invention.

FIG. 4 shows a functional block diagram of a preprogrammed system, the preprogrammed system being the electronic identification circuit 25 integrated in the collar 14.

The electronic identification circuit 25 includes means M1 for receiving electrical power from the carrying current so as to supply power to the electronic identification circuit, which means M1 obviates a requirement for an incorporated energy supply. For example, a simple rectifier may function to transform a low power alternating current passing between points E and S into a direct current voltage between "+" and "−".

The electronic identification circuit 25 also includes means M2 for storing in a non-volatile memory identification number N. This number N may be, for example stored in a part ME of M2 by preprogramming the non-volatile memory using a connection means MM which preferably is connected for programming to a central unit UC or to the data processor before placing the identification circuit 25 in the collar. The central unit UC is capable of writing a data word of, for example 8, 16, 32 bits or more, into the non-volatile memory via the connection means MM. Means M2 also includes a second part MC which sends the number N to other parts of the electronic identification circuit 25. ME may include either microfuses, for example, 1 microfuse per bit which will either be melted or not melted at the time of of programming, or a masked programmable type part.

Figure 6:
FIG. 6 shows an example of the shape of the conditioning signal for the identification number carrying current.
Figure 7:
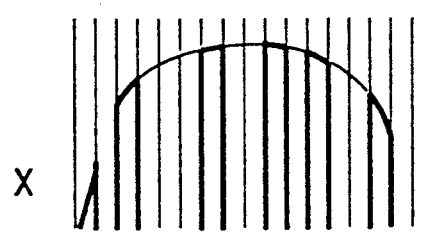
FIG. 7 shows an example of the shape of the exit signal that corresponds to the identification number of the animal.

The electronic system also includes means M3 having a part ML for reading or for receiving the identification number N sent by part MC. Part MC may be integrated in ML. Means M3 also has a part MT which is a transmission means for transmitting an identification signal or signals. The identification signal will be preferably transmitted as a pulse train (FIG. 6) through a means MS which conditions the exiting signal (FIG. 7).

Figure 5:
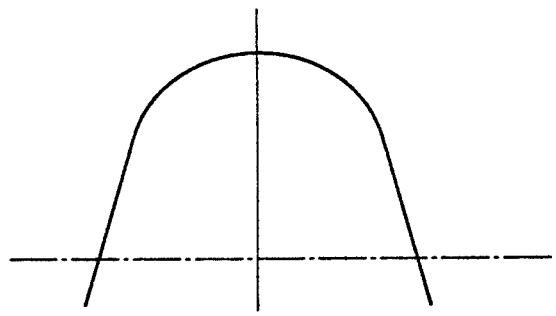
FIG. 5 shows an example of the shape of the carrying current before conditioning.

The electronic identification circuit 25 also includes the means MS for exit signal conditioning by mixing the pulse train with the carrying current. In the case that this current is, for example alternating, at every half-cycle alternation (single or double half-cycles, see FIG. 5), the signal to be conditioned includes of as many pulses as there are bits necessary for the definition of the number N (FIG. 6, FIG. 7). Each of these bits are preferably equal to zero amperes (logic=0) or at x amperes (logic=1), x being the amplitude of the carrying current on a sinusoidal wave of the carrying current at the time in which the pulse is produced (FIG. 7).

The voltage delivered to the collar between the connections S and E, which may have one or several contacts, produces a carrying current according to a resistance in the electronic identification circuit. The carrying current is sensed and is read by the central unit or by the computer or the data processor 13. The sensed current is analyzed to recognize the number N of the collar. For example, the sensed current may include an alternating current supplying power to the collar and a pulse train indicative of the number N of the collar superimposed or modulated thereon. After analysis, the control unit or the computer recognizes the number N of the collar by extracting the pulse train.

Figure 8:
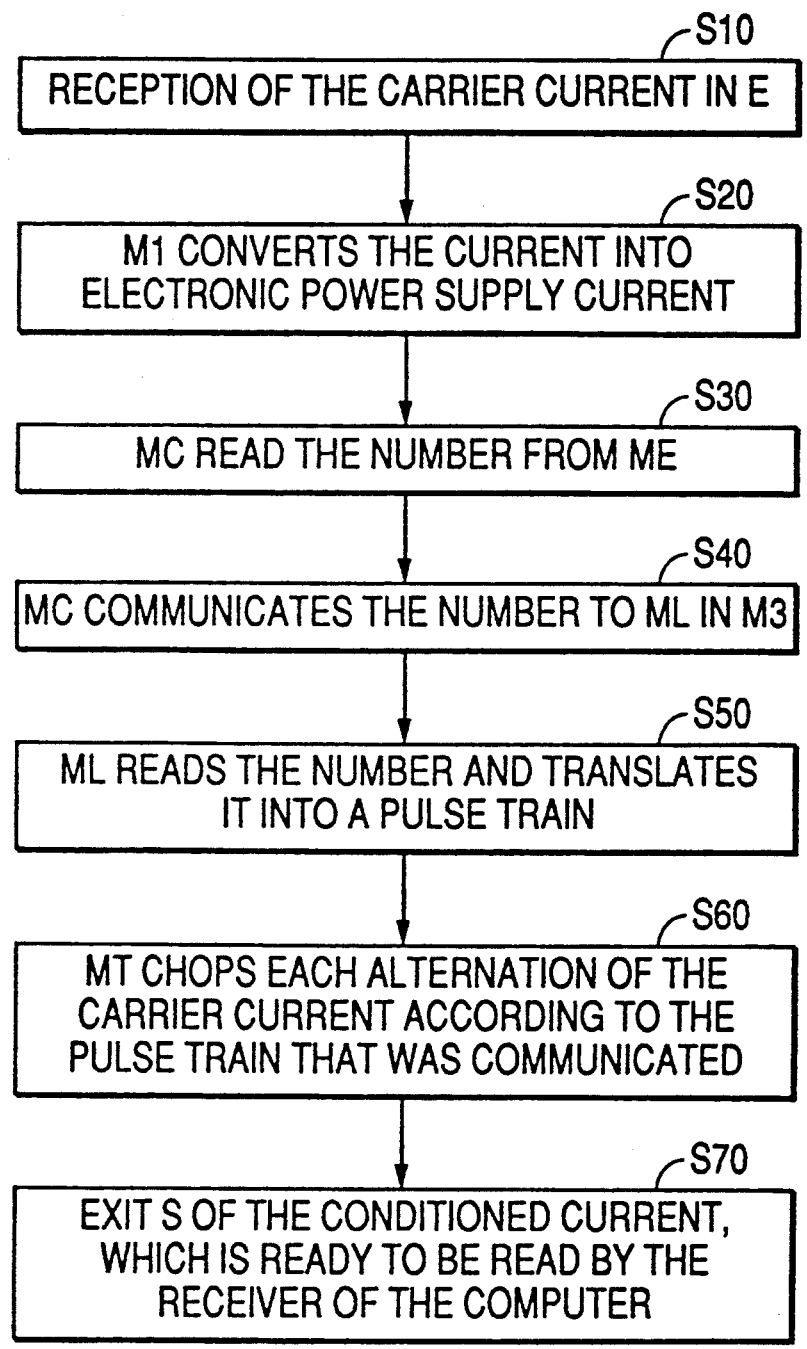
FIG. 8 is a flow chart showing the operation of the electronic identification circuit integrated in the collar.

FIG. 8 shows a flow chart of the operation of the electronic identification circuit 25 integrated in the collar. In FIG. 8, at step S10 the carrying current between terminals E and S is received. At step S20, means M1 converts the carrying current (e.g. an alternating current) into an electronic power supply voltage between nodes "+" and "−". At step S30, part MC reads a predetermined number associated with the collar from part ME. At step S40, part MC communicates the predetermined number to part ML in means M3. At step S50, part ML receives the predetermined number and translates the number into a pulse train corresponding to that number. At step S60, part MT chops each alternation of the carrying current according to the pulse train that was received by ML. At step S70, part MS conditions the carrying current between terminals E and S by modulating the carrying current with the pulse train so that it can be read by a receiver of the computer or the data processor.

Figure 9:
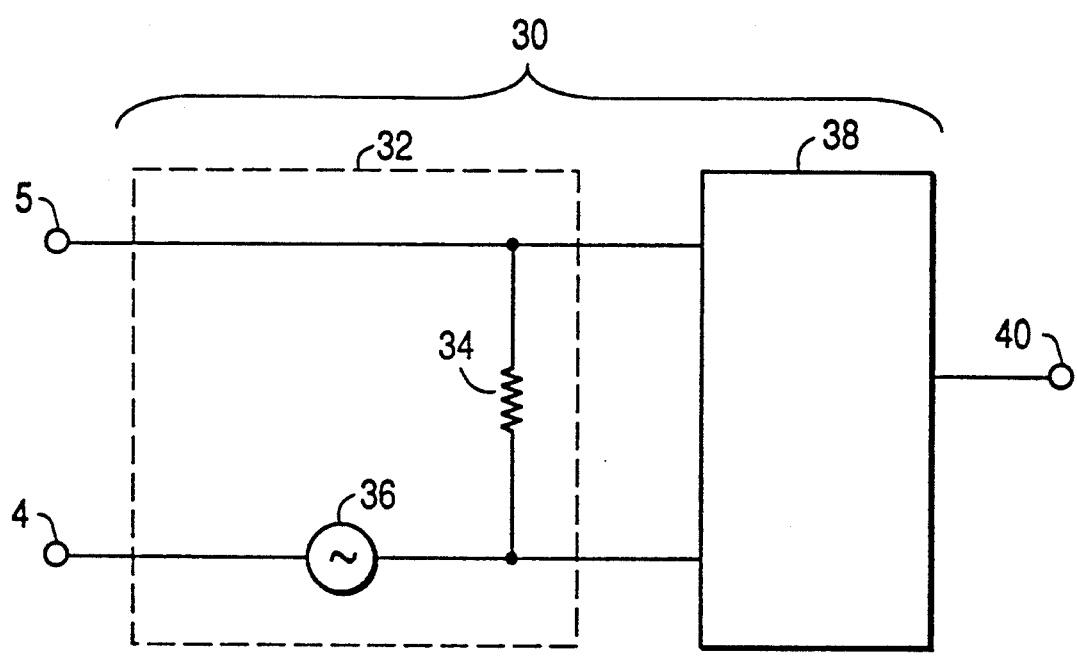
FIG. 9 is a schematic diagram of an example processor of the present invention.

In FIG. 9, processor 30 comprises voltage source 32 connected to metallic bars 4 and 5, and computer 38 connected to voltage source 32, processor 30 being an example of processor 13 of FIG. 1. Voltage source 32 includes carrying current source 36 connected in series with resistor 34. When the presence detection electrical circuit is closed by the resistance in collar 14 being applied across bars 4 and 5, the carrying current begins to flow through among other parts, the resistor 34 resulting in a small voltage difference across resistor 34. When the carrying current is modulated by the collar 14, according to the particular identification number N, the voltage difference across resistor 34 is also modulated. This modulated voltage difference across resistor 34 is sensed by computer 34 by known means and demodulated by known means to determine the particular identification number. It will be appreciated that computer 34, with the aid of a known timing means, may determine and record the length and frequency of stay of the animal in the station. The computer may also produce an output signal at terminal 40 to control other functions relating to the animal such as automatic feeding.

In an alternative embodiment, flaps 6 and 7 and attaching hinges 9 and 10 are replaced with corresponding flexible straps or tethers (e.g. of leather, rubber or plastic); metallic bars 4 and 5 are replaced with corresponding conductive magnets; and parts 20 and 21 of collar 14 are formed of a ferrous metal to magnetically attract the conductive magnets. In operation, when the collar 14, carried on the neck of an animal, is moved into place between the two conductive magnets, the magnets are attracted to the ferrous metal in the collar by a magnetic force. The magnetic force causes the magnets to swing through radius R (FIG. 3) and come into contact and conductively attach to parts 20 and 21 of the collar 14. Processor 30 (FIG. 9) is conductively connected to the conductive magnets (indicated as numerals 4 and 5 in FIG. 9) so that when an animal bearing the collar 14 is present in the feeding station, processor 30 causes a carrying current to conduct through the collar 14, the carrying current being modulated according to a predetermined identification number stored in the collar 14. With this embodiment, a feeding station can accomodate a wide variety of collar widths.

Having described preferred embodiments of a novel individual animal identification system (which are intended to be illustrative and not limiting), it is noted that modifications and variations can be made by those skilled in the art in light of the above teachings. For example, articles of production on an assembly line may be substituted for the individual animals. It is therefore to be understood that changes may be made in the particular embodiments of the invention disclosed which are within the scope and spirit of the invention as defined by the appended claims.

Having thus described the invention with the details and particularity required by the patent laws, what is claimed and desired protected by Letters Patent is set forth in the following claims.

What is claimed is:

1. An individual animal identification system for identifying a particular animal in a particular station with a particular number, the identification system comprising:
   at least one station, each station of the at least one station as the particular station including a first flap and a second flap disposed symmetrically about a vertical plane and hingedly attached to a structure forming a passage way, and a first metallic bar and a second metallic bar attached at their extremities substantially horizontally to respective flaps of the first and second flaps;

a collar carried around a neck of the particular animal, the collar cooperating with the first and second metallic bars to close a presence detection electrical circuit when the particular animal is in the passage way of the particular station; and a processor, the processor including first means connected between the first and second metallic bars for supplying a source voltage to the collar, the collar having a resistance causing a carrying current to flow when the presence detection electrical circuit is closed, the collar also having means for extracting electrical power from the carrying current and means for modulating the carrying current according to the particular number, the processor also including second means connected to the first means for sensing and analyzing the modulated carrying current to determine the particular number.

2. The identification system of claim 1, wherein the first and second metallic bars attached substantially horizontally are attached so as to be slightly inclined.

3. The identification system of claim 1, wherein the particular station is a feeding station and the passage way has sufficient width to permit a passage of a front of a body of the particular animal and to permit insertion of a head of the particular animal so that the collar cooperates with the first and second metallic bars to close the presence detection electrical circuit.

4. The identification system of claim 1, wherein the collar comprises:

a first metallic tube having top and bottom extremities;

a second metallic tube having top and bottom extremities, the bottom extremity of the first tube being semi-rigidly and insulatively joined to the bottom extremity of the second tube;

means for attaching the collar to the particular animal; and identification circuit connected between the first and second metallic tubes, the identification circuit being the means for extracting and the means for modulating.

5. The identification system of claim 4, wherein the first and second metallic tubes are joined at their bottom extremities to form an approximate V shape with a semi-rigid plastic tube forming a wide base radius for a vertex of the approximate V shape.

6. The identification system of claim 5, wherein the identification circuit is disposed inside of the semi-rigid plastic tube.

7. The identification system of claim 4, wherein the first and second metallic tubes are made of stainless steel.

8. The identification system of claim 4, wherein the first and second metallic tubes are protected against corrosion.

9. The identification system of claim 4, wherein the means for attaching the collar includes means for joining a cord between the top extremity of the first metallic tube and the top extremity of the second metallic tube.

10. The identification system of claim 1, wherein:

the passage way of the particular station is characterized by a width between the first and second flaps, a height of the first and second metallic bars, and a radius of swing of the first and second flaps; and at least one of the width, the height and the radius of swing is adjustable to match a size of the particular animal.

11. The identification system of claim 1, wherein:

the first and second flaps swing out about respective points of attachment to the structure to expand the passage way when an approaching animal enters the particular station;

the particular station includes means for selectively locking the first and second flaps to selectively prevent the expansion of the passage way and block the approaching animal from entering the passage way, the means for selectively locking being responsive to a locking control signal; and the identification system further includes third means for generating the locking control signal to selectively block the passage way during particular times of the day.

12. The identification system of claim 11, wherein:

the third means for generating the locking control signal generates the locking control signal when the second means for sensing and analyzing determines that the approaching animal is the particular animal identified by the particular number.

13. The identification system of claim 1, wherein the particular station includes a deflector adjustable in height and affixed to the structure for forcing the particular animal to lower its head to a height where the first and second metallic bars cooperate with the collar to close the presence detection electrical circuit.

14. The identification system of claim 1, wherein the collar includes an identification circuit, the identification circuit including:

means for supplying power to the identification circuit, the means for supplying power including the means for extracting;

means for retrieving a predetermined stored identification number, the predetermined identification number being the particular number;

means for generating a pulse train corresponding to the predetermined number; and means for conditioning an exit signal based on the pulse train, the means for retrieving, generating and conditioning being the means for modulating, the conditioned exit signal being the modulated carrying current.

15. The identification system of claim 14, wherein the means for retrieving includes a non-volatile memory storing the predetermined identification number.

16. The identification system of claim 15, wherein the identification circuit further includes means for connecting the non-volatile memory to a computer so that a predetermined identification number from the computer can be stored in the non-volatile memory as the predetermined stored identification number.

17. The identification system of claim 15, wherein the non-volatile memory includes microfuses.

18. The identification system of claim 14, wherein the predetermined stored identification number is a number having one of 8, 16 and 32 bits.

19. The identification system of claim 14, wherein the means for conditioning includes a selectively controllable resistance, the selectively controllable resistance being selectively controlled by the pulse train to produce the modulated carrying current.

20. In an individual animal identification system cooperating with a collar carried around a neck of a particular animal for identifying the particular animal with a particular number, the individual animal identification system having a particular station with first and second flaps disposed symmetrically about a vertical plane and hingedly attached to a structure so as to form a passage way, and with first and second metallic bars attached at their extremities to respective flaps of the first and second flaps, the individual animal identification system also having a processor with first means connected between the first and second metallic bars for supplying a source voltage to the collar when the collar is connectively cooperating with the first and second metallic bars, and with second means connected to the first means for sensing and analyzing a modulated carrying current to determine the particular number, a collar comprising:

a first metallic tube having top and bottom extremities;

a second metallic tube having top and bottom extremities, the bottom extremity of the first tube being semi-rigidly and insulatively joined to the bottom extremity of the second tube;

means for attaching the collar to the particular animal; and identification circuit connected between the first and second metallic tubes, the identification circuit having selectively controllable resistance between the first and second metallic tubes for generating a carrying current when the collar is connectively cooperating with the first and second metallic bars.

21. The collar of claim 20, wherein the first and second metallic tubes are joined at their bottom extremities to form an approximate V shape with a semi-rigid plastic tube forming a wide base radius for a vertex of the approximate V shape.

22. The collar of claim 21, wherein the identification circuit is disposed inside of the semi-rigid plastic tube.

23. The collar of claim 20, wherein the first and second metallic tubes are made of stainless steel.

24. The collar of claim 20, wherein the first and second metallic tubes are protected against corrosion.

25. The collar of claim 20, wherein the means for attaching the collar includes means for joining a cord between the top extremity of the first metallic tube and the top extremity of the second metallic tube.

26. The collar of claim 20, wherein the identification circuit includes:

means for extracting power from the carrying current;

means for retrieving a predetermined stored identification number, the predetermined identification number being the particular number;

means for generating a pulse train corresponding to the predetermined number; and means for conditioning an exit signal based on the pulse train, the conditioned exit signal being the modulated carrying current.

27. The collar of claim 26, wherein the means for retrieving includes a non-volatile memory storing the predetermined identification number.

28. The collar of claim 27, wherein the identification circuit further includes means for connecting the non-volatile memory to a computer so that a predetermined identification number from the computer can be stored in the non-volatile memory as the predetermined stored identification number.

29. The collar of claim 27, wherein the non-volatile memory includes microfuses.

30. The collar of claim 26, wherein the predetermined stored identification number is a number having one of 8, 16 and 32 bits.

31. The collar of claim 26, wherein the means for conditioning includes means for controlling the selectively controllable resistance, the selectively controllable resistance being selectively controlled by the pulse train to produce the modulated carrying current.

32. A passive identification system comprising:

a station having first and second terminals;

a voltage source connected across the first and second terminals;

a collar capable of being disposed in the station to cooperate with the first and second terminals to complete a presence detection electrical circuit, the presence detection electrical circuit including the voltage source and the collar, the collar including a selectively controllable resistance so that the presence detection electrical circuit conducts a carrying current selectively modulated according to the selectively controllable resistance, the collar also including means for extracting electrical power from the carrying current and means powered by the extracted electrical power for controlling the selectively controllable resistance according to a predetermined identification number, the voltage source including means for sensing the selectively modulated carrying current and means for determining the predetermined identification number according to the selectively modulated carrying current.

33. In an individual animal identification system cooperating with a collar carried around a neck of a particular animal for identifying the particular animal with a particular number, the individual animal identification system having a particular station with first and second flaps disposed symmetrically about a vertical plane and hingedly attached to a structure so as to form a passage way, and with first and second metallic bars attached at their extremities to respective flaps of the first and second flaps, the individual animal identification system also having a processor with first means connected between the first and second metallic bars for supplying a source voltage to the collar and for generating a carrying current when the collar is connectively cooperating with the first and second metallic bars, and with second means connected to the first means for sensing and analyzing a modulated carrying current to determine the particular number, a method for modulating the carrying current to indicate the particular number comprising steps of:

extracting power from the carrying current to power an identification circuit;

retrieving the particular number, the particular number having been stored in the identification circuit;

generating a pulse train corresponding to the particular number; and modulating the carrying current according to the pulse train to generate the modulated carrying current.

* * * * *